United States Patent [19]

McIlwain

[11] 4,384,445
[45] May 24, 1983

[54] MECHANISM FOR RELEASABLY CLAMPING A WHEEL ASSEMBLY TO A HEADER CUTTERBAR

[75] Inventor: Irwin D. McIlwain, Lancaster, Pa.

[73] Assignee: Sperry Corporation, New Holland, Pa.

[21] Appl. No.: 340,599

[22] Filed: Jan. 19, 1982

[51] Int. Cl.³ .............................................. A01B 73/00
[52] U.S. Cl. ....................................... 56/228; 56/15.2
[58] Field of Search ................... 56/228, 15.2, DIG. 9, 56/341, 10.4, 14.9, 15.2, 15.4, 17.2

[56] References Cited

U.S. PATENT DOCUMENTS

| | | | |
|---|---|---|---|
| 2,833,105 | 5/1958 | Naery | 56/228 |
| 3,279,158 | 10/1966 | Kirkpatrick | 56/228 |
| 3,457,709 | 6/1969 | Killberry | 56/228 |
| 3,608,753 | 9/1971 | Scott | 56/228 |
| 3,683,605 | 8/1972 | Jakobi | 56/228 |
| 4,084,394 | 4/1978 | Van der Lely | 56/228 |
| 4,329,833 | 5/1982 | Witzel | 56/228 |

FOREIGN PATENT DOCUMENTS 2353172 10/1973 Fed. Rep. of Germany ........ 56/228
1206648 11/1966 United Kingdom ........... 56/DIG. 9

Primary Examiner—Paul J. Hirsch
Assistant Examiner—John G. Weiss
Attorney, Agent, or Firm—Larry W. Miller; Frank A. Seemar; Darrell F. Marquette

[57] ABSTRACT

A wheel assembly for use in converting a crop harvesting header from a harvest mode to a transport mode is disclosed wherein the wheel assembly is clamped onto the cutterbar by a clamping mechanism such that the header can serve as its own carrier. The clamping mechanism includes a clamping member pivotally connected to the main body member and an overcenter locking mechanism to force the clamping member into engagement with the cutterbar such that the main body member is releasably engaged with the mower guards to mobilely support a part of the weight of the header above the ground. The clamping mechanism is affixed to one end of a support post, which also has a spindle rotatably mounting a wheel at the opposing end.

26 Claims, 7 Drawing Figures

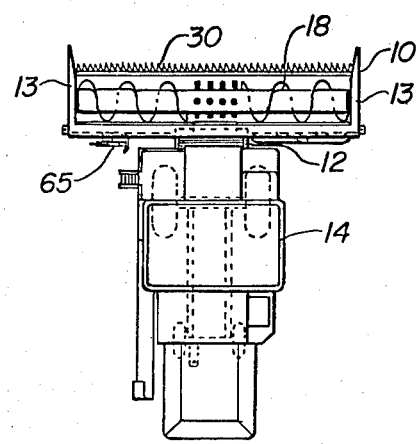
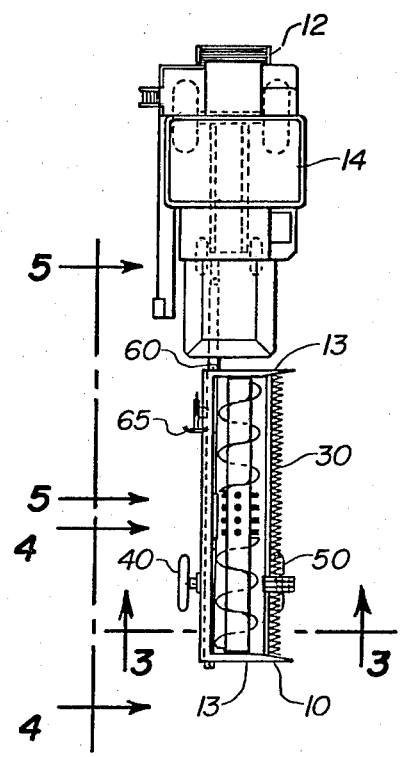
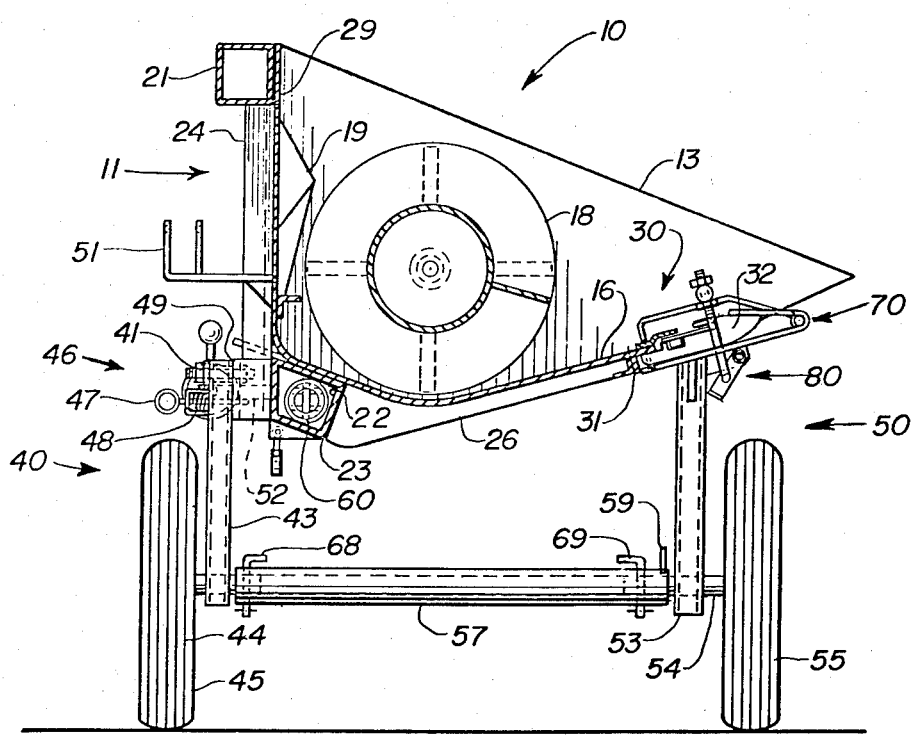

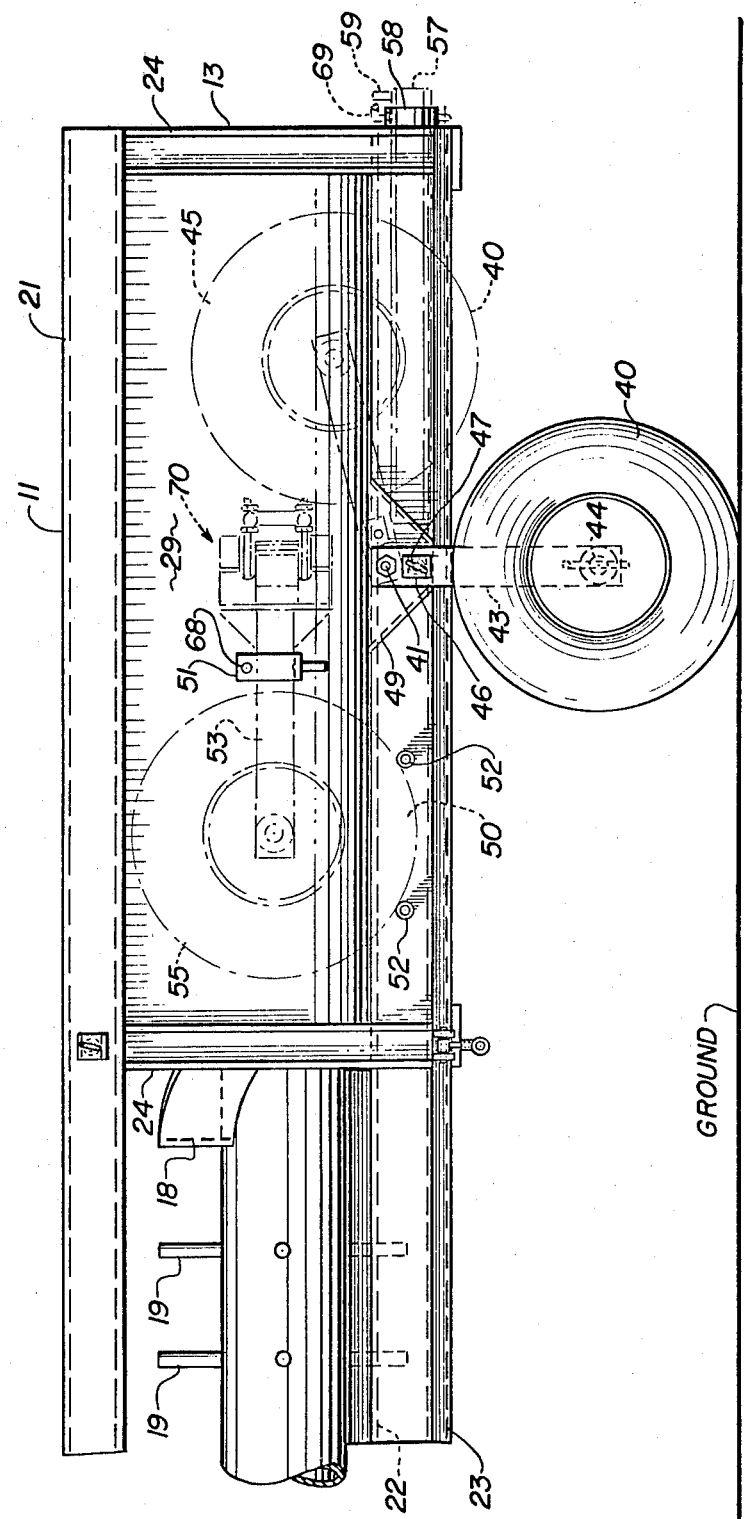

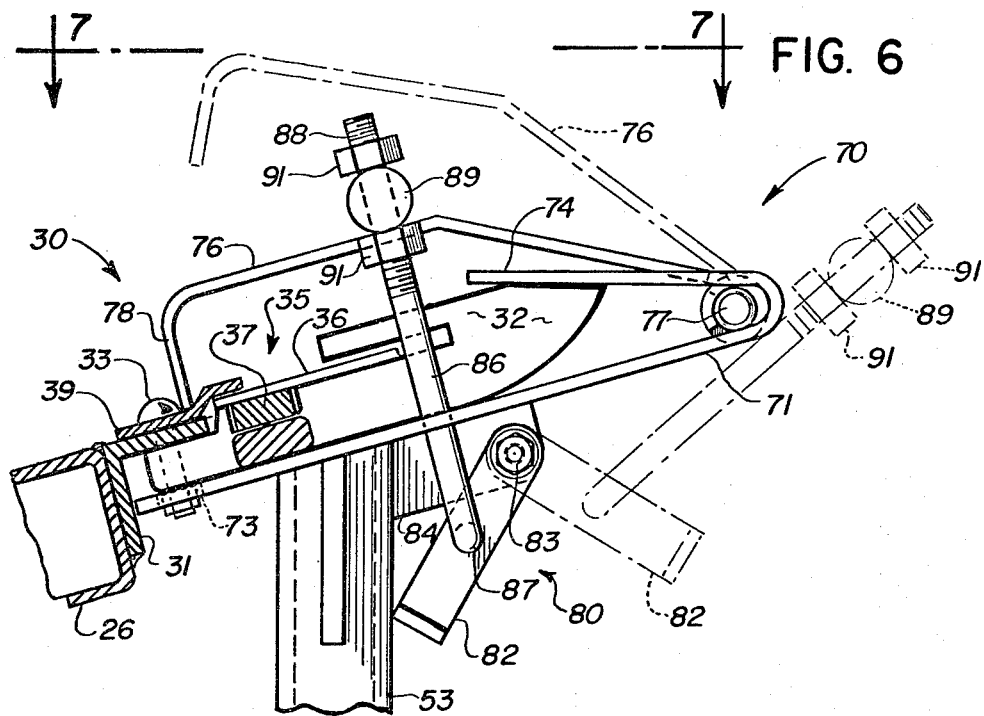
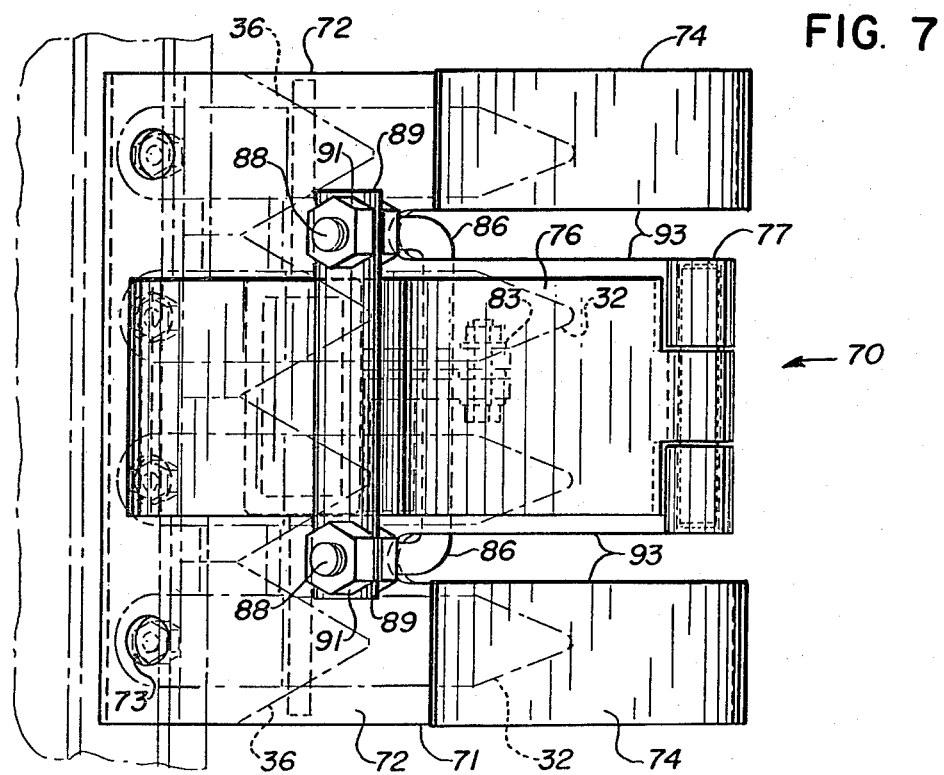

MECHANISM FOR RELEASABLY CLAMPING A WHEEL ASSEMBLY TO A HEADER CUTTERBAR

BACKGROUND OF THE INVENTION

The present invention relates generally to crop harvesting headers attachable to a combine to initiate the crop harvesting process and, more particularly, to improvements in the transportation of the headers over the ground from one work location to another.

Crop harvesting headers used to harvest grain crops, such as wheat, oats, barley, etc., generally include a reciprocating type cutterbar at its forwardmost location to sever standing crop material and initiate the crop harvesting process. Such grain headers typically include a reel to convey severed crop material rearwardly from the cutterbar and a consolidating mechanism, such as an auger, to consolidate the severed crop material and discharge it rearwardly through an appropriate opening in the header to the combine for further harvesting treatment.

With the advent of higher capacity harvesting machines, the size of the crop harvesting headers, as measured by the length of the cutterbar extending between the forwardly extending sidesheets at opposing ends of the cutterbar, has been steadily increasing. For example, it is not unheard of for the cutting width of current grain headers to approach thirty feet. Clearly, the trend is to increase the size of these headers as this practice decreases the amount of harvesting time necessary to harvest a given crop and increases the harvesting efficiency of the larger capacity combines.

However, increasing the size header creates problems of transporting the header from field to field or from one location to another, particularly if the path along which the header is transported involves the crossing or utilization of public roads. Mechanisms, such as taught in U.S. Pat. No. 3,245,695, which permit the towing of the crop harvesting header in a transverse attitude behind the combine, inherently have the problem of disposition of the wheeled undercarriage and supporting structure during the harvesting operation. Typically, such devices are left at the location in the field where the harvesting operation begins; however, by the time the harvesting is finished for the day, the combine may be several miles from its place of beginning. Other methods of transporting headers include utilization of a separate vehicle to carry the header from location to location. Therefore, it is highly desirable to provide a self-contained transpoting mechanism to avoid the expense and inconvenience of providing additional transporting structures.

SUMMARY OF THE INVENTION

It is an object of this invention to overcome the aforementioned disadvantages of the prior art by providing a self-contained apparatus within a crop harvesting header to provide for the transportation of the header in a transverse attitude rearwardly of the combine.

It is an advantage of this invention that the wheeled structure for mobilely supporting the crop harvesting header off the ground during transport is carried with the header during the normal crop harvesting operation.

It is another object of this invention that the transport apparatus for a combine header can be partially dismantled and stored within or carried on the header during the crop harvesting operation.

It is still another object of this invention to provide a mechanism detacably connectable to the cutterbar of a crop harvesting header to mobilely support a part of the weight of the header off the ground when converted to a transport mode.

It is a further object of this invention to provide a clamping mechanism to detachably connect a wheel assembly to the mower guards of a header cutterbar.

It is a feature of this invention that the clamping mechanism is provided with an overcenter locking mechanism to fix the wheel assembly in the desired position on the cutterbar.

It is another advantage of this invention that the conversion of the header from the harvest mode to the transport mode can be accomplished on either a rigid or a flexible header.

It is a still further object of this invention to utilize the header as its own carrier for transport thereof from one location to another.

It is yet a further object of this invention to provide a method and apparatus for the transportation of a crop harvesting header in a transverse attitude rearwardly of the combine, which is inexpensive of manufacture, carefree of maintenance, facile in assemblage, and simple and effective in use.

These and other objects, features and advantages are accomplished according to the instant invention by providing a wheel assembly for use in converting a crop harvesting header from a harvest mode to a transport mode is disclosed wherein the wheel assembly is clamped into the cutterbar by a clamping mechanism such that the header can serve as its own carrier. The clamping mechanism includes a clamping member pivotally connected to the main body member and an overcenter locking mechanism to force the clamping member into engagement with the cutterbar such that the main body member is releasably engaged with the mower guards to mobilely support a part of the weight of the header above the ground. The clamping mechanism is affixed to one end of a support post, which also has a spindle rotatably mounting a wheel at the opposing end.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a diagrammatical plan view of a crop harvesting header, incorporating the principals of the instant invention, attached to the feeder house of a combine base unit in the harvest mode;

FIG. 2 is a diagrammatical plan view of a crop harvesting header converted to the transport mode and being towed behind the combine base unit;

FIG. 3 is a cross sectional view of the crop harvesting header in the transport mode as shown in FIG. 2, taken along lines 3—3;

FIG. 4 is a partial rear view of the crop harvesting header in the transport mode as shown in FIG. 2, showing the right end of the header, corresponding to lines 4—4 in FIG. 2, in the harvest mode being shown in phantom;

FIG. 6 is an enlarged detailed view, corresponding to the view seen in FIG. 3, of the clamping mechanism for attaching the second wheel assembly to the header cutterbar, the movement of the over center latching device and the clamping member being shown in phantom; and FIG. 7 is a plan view of the clamping mechanism seen in FIG. 6 and taken along lines 7—7.

DETAILED DESCRIPTION OF THE PREFERRED EMBODIMENT

Figure 5:
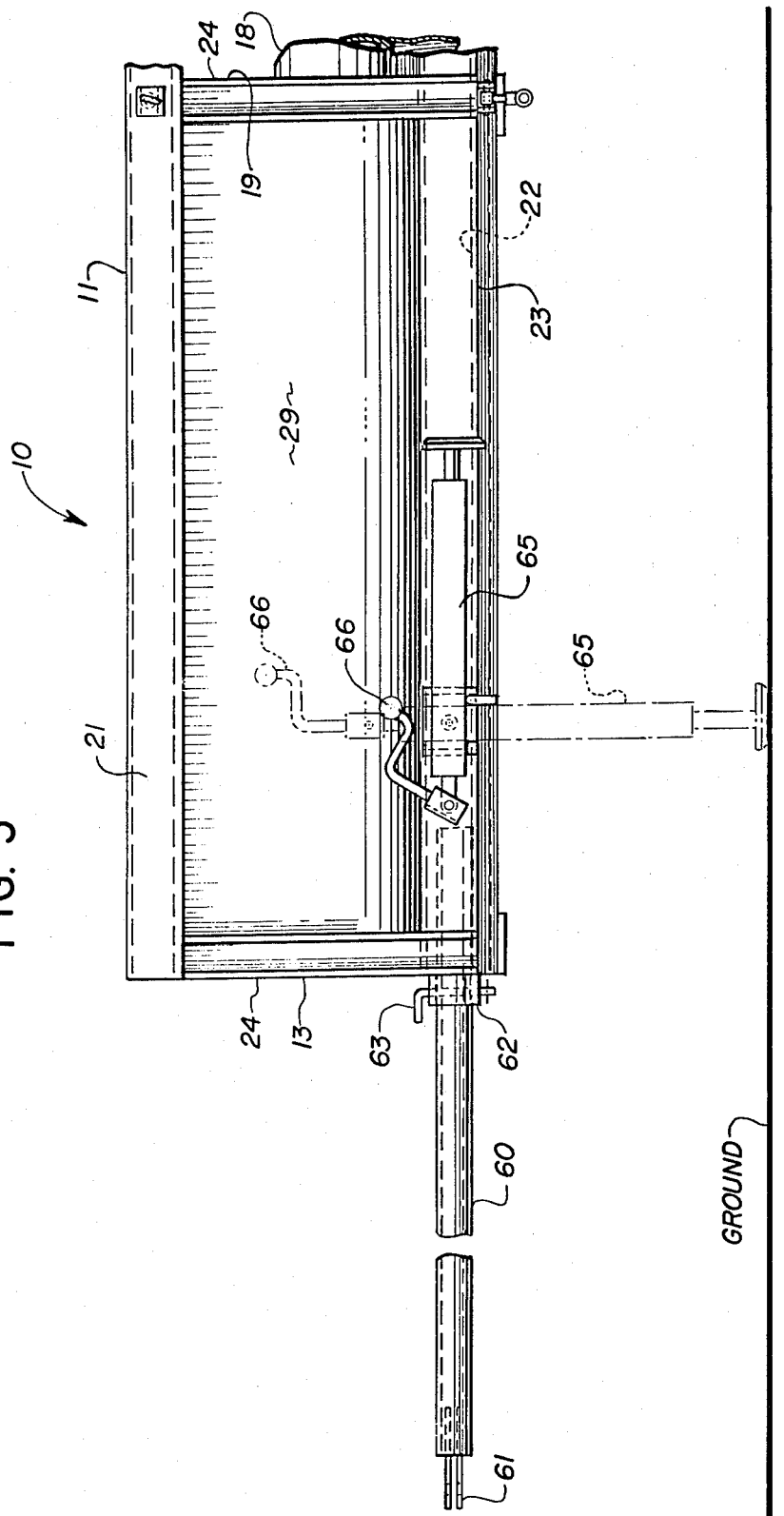
FIG. 5 is a partial rear view of the crop harvesting header in the transport mode as seen in FIG. 2, showing the left end of the header, corresponding to lines 5—5 of FIG. 2, the ground engaging support position of the jack being shown in phantom.

Referring now to the drawings and, more particularly, to FIG. 1, a diagrammatical plan view of a crop harvesting header attached to a combine base unit in a harvest mode can be seen. Any left and right references are used as a matter of convenience and determined by standing at the rear of the combine base unit, facing the forward end, the direction of travel. The crop harvesting header 10 is shown attached to the feeder house structure 12 through which crop material is conveyed to the combine 14 for harvesting treatment.

The header 10 normally includes a frame 11 supporting spaced apart sidesheets 13 defining the width of the header, a reciprocating cutterbar 30 forwardly disposed of the header 10 between the sidesheets 13 to sever standing crop material and initiate the crop harvesting process, a floor 16 extending rearwardly from the cutterbar over which severed crop material is conveyed, and an auger 18 operatively cooperating with the floor 16 to consolidate severed crop material and discharge it through a centrally located aperture 19 in the header 10 to the feeder house 12 which in turn conveys the severed crop to the combine base unit 14 for further harvesting treatment. Typically, a reel (not shown for reasons of clarity) is mounted between the sidesheets 13 above the cutterbar 30 to convey severed crop material over the floor 16 from the cutterbar 30 to the consolidating auger 18.

According to the principals of the invention disclosed herein, the header 10 is convertible between a harvest mode, shown in FIG. 1, and a transport mode, shown in FIG. 2. By transporting the header 10 in a transverse attitude, as seen in FIG. 2, the overall transport width is significantly reduced from the normal harvest mode, seen in FIG. 1. By utilizing the apparatus carried by the header during the harvest mode, the header can be conveniently and easily converted to its transport mode and the header then becomes its own carrier.

Referring now to FIGS. 3, 4 and 5, the details of the instant invention can readily be seen. The header frame 11 is generally comprised of an upper transverse box-like main beam 21 and a lower box-like transverse main beam 23 formed with a passageway 22 transversely therethrough and connected with the upper beam by a series of generally vertical frame members 24. A plurality of supporting ribs 26 are fixed to the lower beam 23 and project forwardly therefrom to support the floor 16 and the reciprocating cutterbar 30. As seen in FIG. 3, the floor 16 continues in a vertical manner adjacent the vertical frame members 24 to form the back wall 29 of the header in which the discharge opening 19 is located.

One skilled in the art will readily recognize that it is currently common practice to produce a rigid header, depicted in FIG. 3, in which the support ribs 26 are rigidly affixed to the lower beam 23 and a flexible header in which the support ribs 26 are pivotally connected to the lower beam 23 in such a manner that the cutterbar 30 is free to vertically flex to more closely follow undulation in the ground surface. Although the instant invention is shown in conjunction with a rigid header, a flexible header equipped with the apparatus in the manner shown, with one or more modifications to provide adequate support along the header cutterbar, can likewise be converted to a transport mode.

As can be seen in FIGS. 3, 6 and 7, the cutterbar 30 includes a transverse primary support bar 31, shown in the form of an angle iron, affixed to the support ribs 26, as by welding. A series of mower guards 32 are connected to the primary support bar 31 by fastening members 33, such as bolts with nuts threaded onto them, in a transverse array along the cutterbar 30 between the sidesheets 13. A sickle assembly 35 is operatively received within the series of mower guards 32 for reciprocatory motion relative thereto. The sickle assembly is formed by mounting a series of triangularly shaped knife elements 36 to an elongated knife back 37. As is well known in the art, the reciprocatory movement of the knives 36 relative to the mower guards 32 causes a shearing action to sever standing crop material. A wear strip 39 is provided to help maintain the position of the sickle assembly 35 relative to the mower guards 32 during the cutting action, as is described in further detail in co-pending U.S. Ser. No. 203,173.

Referring now to FIGS. 3 and 4, the wheel assemblies 40, 50 used in converting the header 10 from its harvest mode to its transport mode can be seen. The first wheel assembly 40 is pivotally connected to the frame 11 by pivot 41. The first wheel assembly 40 includes a support post 43 connected at one end to the pivot 41 and at its opposing end to a spindle 44, which, in turn, rotatably mounts the wheel 45. When pivoted downwardly into the ground engaging position, as seen in FIGS. 3 and 4, the first wheel assembly 40 supports a part of the weight of the header 10 above the ground for movement in a transverse direction.

During the harvest mode, the first wheel assembly is pivoted into a retracted position, shown in phantom in FIG. 4. To hold the first wheel assembly 40 in either the retracted position or the ground engaging position, a locking device 46 is provided. The locking device 46 includes a spring loaded locking pin 47 slidably received through the support post 43 adjacent the pivot 41 and engageable with a suitably apertured plate 49 stationarily affixed to the frame 11. The spring 48 biases the locking pin 47 into engagement with the plate 49.

The second wheel assembly 50 is carried within a mounting bracket 51 and supported on support dowels 52 affixed to the frame 11 adjacent the retracted position of the first wheel assembly 40. One skilled in the art will readily realize that other arrangements, within the scope and principals of the instant invention, for carrying the first and second wheel assemblies on the header during the harvesting mode, beside that depicted in FIG. 4, are possible. For example, by rearranging the position of the mounting bracket 51 and the support dowels 52 and providing the retracted position of the first wheel assembly 40 to swing to the left, as viewed in FIG. 4, rather than to the right, it would be possible to provide a nesting arrangement between the first and second wheel assemblies 40 and 50, with the second wheel assembly 50 being positioned at least partially between the wheel 45 and the header frame 11.

The second wheel assembly 50 is generally similar in construction to the first wheel assembly 40 in that it includes a support post 53 having a spindle 54 affixed to one end for the rotatable mounting of a wheel 55. The opposing end of the support post 53 is attached to a clamping mechanism 70, which is operable to detachably connect the second wheel assembly 50 to the cutterbar 30 for mobily supporting a portion of the weight of the header 10 for movement in a transverse direction.

As can be seen in FIGS. 3, 4 and 5, the lower transverse beam 23 can be used to store an axle 57 adjacent the mounting of the wheel assemblies 40,50 to the frame 11. Spindles 44 and 54 are adapted for connection to the axle 57 to provide stability between the first and second wheel assemblies 40,50 and thereby form a stable undercarriage for the transportation of the header 10. The lower beam 23 is provided with a retension collar 58, best seen in FIGS. 3 and 4, to prevent the axle 57 from being unintentionally removed from the lower beam 23. A tab 59 is affixed to one end of the axle 57 to prevent it from sliding entirely within the passageway 22 of the lower beam 23.

At the opposing end of the lower beam 23, a tongue 60 is telescopically received within the passageway 22. A clevis 61 connected to the end of the tongue 60 serves as an attachment mechanism for connecting the header 10 to the combine base unit or another source of motive power. A positioning collar 62 affixed to the frame 11 and the corresponding pin 63 are cooperable with the tongue 60, having a series of apertures therethrough which are alignable with the pin 63, enable the clevis 61 to be positioned at any given length from the sidesheet 13 of the header 10.

A jack 65 is pivotally mounted to the frame 11 of the header 10 adjacent the tongue 60 at a position spaced from the pivotal mounting 41 of the first wheel assembly 40. The jack 65 is pivotally positionable between an unobstructing position, seen in solid lines in FIG. 5, and a ground engaging position, shown in phantom in FIG. 5. During the conversion of the header 10 from the harvest mode to the transport mode, the jack 65 stationarily supports a part of the weight of the header 10 above the ground until the clevis 61 can be connected to the towing vehicle. The handle 66 is used to manipulate the length of the jack 65, as is well known in the art.

Connecting pins 68 and 69 are used to detachably connect the axle 57 to the spindles 44 and 54, respectively. Connecting pin 68 is utilized with the mounting bracket 51 to maintain the second wheel assembly 50 in its mounted position during the harvest mode. Connecting pin 69 is utilized with the retension collar 58 to maintain the axle 57 within the passageway 22 of the lower beam 23 while the header 10 is in the harvest mode. Although connecting pins 63, 68 and 69 are of identical size and shape, it should be noted that the number of pins utilized to store the transport components during the harvest mode is equal to the number of connecting pins utilized to convert the header to the transport mode. As a result, there are no loose pins to become lost during one mode or the other.

The clamping mechanism 70 is utilized to detachably connect the second wheel assembly 50 to the cutterbar 30. A main body member having first generally planar portion 72 is mounted to the end of the support post 53 at an oblique angle to the line of the support post 53 to correspond to the angle of the cutterbar 30 relative to the vertical frame members 24. When clamped into position, the first portion 72 engages the underside of the mower guards 32 to which the second wheel assembly 50 is to be connected. The first portion 72 has a series of holes 73 therein to receive the nut and the portion of the fastening bolts 33 extending below the underside of the mower guards 32. A second planar portion 74 of the main body member 71 is integrally formed with the first portion 72 and engages at least part of the upper side of a part of the mower guards 32 to which the second wheel assembly 50 is attached. A clamping member 76 is pivotally connected to the main body member 71 at pivot 77. The clamping member 76 is of a shape to arch upwardly over the mower guards 32 and includes a downwardly depending leg 78 that engages the cutterbar 30 at a suitable location, such as along the formed wear strip 39.

An overcenter locking member 80 is operable to force the clamping member 76 downwardly into engagement with the cutterbar 30 to maintain the main body member 71 into engagement with the underside of the mower guards 32. The fastening members 33 projecting downwardly through the first portion 72 of the main body member 71 help maintain the main body member 71 in the desired position. The locking mechanism 80 includes a latching member 82 pivotally connected at pivot 83 to a tab 84 projecting from the support post 53. A U-shaped member 86 is pivotally connected to the latching member 82 at a point 87 spaced from the pivot 83.

A clamping bar 89 interconnects the spaced apart legs 88 of the U-shaped member 86. The legs 88 are threaded to engage adjustably positionable nuts 91 such that the position of the clamping bar 89 relative to the pivotal connection 87 can be selectively adjusted to vary the pressure exerted by the locking mechanism 80 on the clamping member 76 to hold the clamping mechanism 70 into the desired position. The main body member 71 includes a pair of spaced apart slots 93 to permit the passage of the legs 88 of the U-shaped member 86 when the clamping mechanism 70 is locked into place. The solid lines of FIG. 6 show the relative position of the individual components of the clamping mechanism 70 when in the locked position, the phantom lines showing a released position of the clamping member 76 and the locking mechanism 80.

As can be seen in FIG. 7, the second portion 74 of the main body member 71 is positioned both to the left and the right of the clamping member 76. Although it is shown in FIG. 7 that each left and right second portion 74 engage one of the mower guards 32, it should be realized that the body member 71 could be made larger to engage more than the four mower guards depicted in FIG. 7. More particularly, if a flexible header is to be transported with the apparatus described above, it would be desirable to provide a clamping mechanism 70 of sufficient size to overlap two ore more of the support ribs 26, so as to provide ample support for the flexible cutterbar 30. Although the first and second portions 72,74 of the main body member 71 are depicted as being planar in cross section, an alterntive embodiment would involve shaping the first and/or second portions 72,74 to more precisely conform to the shape of the mower guards 32 to which they engage.

To convert a crop harvesting header equipped according to the principles of the instant invention as described above, from the harvest mode to the transport mode, it is necessary for the operator to raise the header 10 above the ground a predetermined distance greater than the height of either of the wheel assemblies 40,50 so that there is sufficient room above the ground to convert the header to the transport mode. The following procedure can be accomplished by the following enumerated steps in practically any sequence prior to lowering the header to the ground. The wheel assembly 40 is moved from its retracted position to its ground engaging position by extracting the locking pin 47 from one aperture in the plate 49 and rotating the support post 43 about the pivot 41 until the locking pin 47 reengages the appropriate aperture in the plate 49.

The second wheel assembly 50 is dismounted from its stored position in the mounting bracket 51, the connecting pin 68 being removed from the bracket 51 for later use. The second wheel assembly 50 is positioned in longitudinal alignment, i.e., directly forwardly of, the ground engaging position of the first wheel assembly 40. The main body member 71 of the clamping mechanism 70 is positioned over the appropriate mower guards 32 such that the second portion is engaging the upper side of the mower guards 32. The clamping member 76 is then swung into position such that the depending leg 78 is engageable with the wear strip 39.

The clamping member 76 is locked into place when the clamping bar is moved into its locking position, as seen in solid lines in FIG. 6, with the legs 88 of the U-shaped member 86 being received within the slots 93 in the main body member 71. The movement of the latching member 82 such that the pivot 87 is positioned between the pivot 83 and the support post 53 locks the locking mechanism 80 in an overcenter relationship. While clamping the clamping mechanism 70 into place as noted above, the first portion 72 of the main body member 71 is positioned such that the holes 73 are aligned with the fastening members 33 extending below the underside of the mower guards 32.

Prior to finally fixing the clamping mechanism 70 into its locked position, the axle 57 is withdrawn from the passageway 22 of the lower beam 23 by extracting the connecting pin 69 from the retention collar 58 and pulling the axle outwardly. The axle 57 is slipped over the spindles 44,54 while there is still sufficient movement in the connection of the second wheel assembly 50 to the cutterbar 30 to permit this operation. After clamping the clamping mechanism 70 into its locked position, the connecting pins 68,69 are utilized to connect the axle to the spindles 44,54, respectively. As is well known in the art, cotter pins or the like can be used to prevent the connecting pins 68 and 69 from accidentally withdrawing from the position in which they have been placed.

At the left end of the header 10, the jack 65 is lowered from its unobstructing position to a ground engaging position and the handle 66 manipulated until the jack 65 is of the desired length. The connecting pin 63 is withdrawn from the positioning collar 62 and the tongue 60 extracted from the passageway 22 of the lower beam 23 until the desired distance between the celvis 61 and the sidesheet 13 is obtained. The connecting pin 63 is then reinserted through the positioning collar 62 and through the tongue 60 to lock the tongue 60 in the desired position.

At this point in time, the operator can lower the header 10 until the weight of the header is resting on the first and second wheel assemblies 40,50 and the jack 65. The first and second wheel assemblies 40,50 and the jack 65 providing a three point stance for stationarily supporting the header 10 above the ground until the base unit can be attached to the clevis 61. After the header 10 has been disconnected from the combine base unit 14, the base unit 14 can be positioned until the clevis 61 is attachable to a suitable attachment at the rear of the base unit 14. After the clevis has been connected, the jack 65 can be disengaged from the ground surface and returned to its unobstructing position, as the header is then supportable on the first and second wheel assemblies 40,50 and the tongue 60. The header 10 can then be towed to the next desired location without the use of additional transport structures, as the frame 11 of the header 10 becomes the carrying structure for the header 10 itself.

The conversion of the header from its transport mode to the harvest mode is substantially the reverse of the procedure enumerated above. The jack 65 is moved from its unobstructing position to the ground engaging position to stationarily support the header 10 above the ground. The base unit 14 is detached from the clevis 61 and reconnected to the header 10 such that the header 10 is mounted in its harvesting position on the feeder house 12. The header 10 can then be raised off the ground so that the jack 65 and the wheel assemblies 40,50 are no longer supporting the weight of the header. At this time the tongue 60 can be retracted into the passageway 22 of the lower beam 23; the jack 65 returns to is unobstructing position; the axle 57 disconnected from the spindles 44,54 and returned in its resting position within the passageway 22 in the lower beam 23; the second wheel assembly 50 disconnected from the cutterbar 30 and remounted in the mounting bracket 51 and on the support dowels 52; and the first wheel assembly 40 pivoted to its retracted position with the locking pin 47 appropriately engaged with the apertured plate 49. The connecting pins 63, 68 and 69 are used to store the tongue 60, the second wheel assembly 50 and the axle 57, respectively, so that there are no extra connecting pins to get lost before reconversion to the transport mode.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. A wheel assembly removably attachable to a cutterbar on a crop harvesting header to assist in the transport of said header after being operatively detached from a mobile base unit, said cutterbar having a primary support bar defining the transverse length of said cutterbar, a plurality of mower guards connected to said primary support bar and extending generally perpendicularly thereto and a sickle assembly operatively received within said mower guards for transverse reciprocatory motion relative thereto, comprising:
   a support post having a first end and a remote second end, said support post being positioned generally vertically beneath said cutterbar when said wheel assembly is attached to said cutterbar;
   a spindle mounted at said first end of said support post and extending at generally right angles thereto;
   a wheel rotatably mounted on said spindle to engage the ground after said wheel assembly is attached to said cutterbar to assist in mobilely supporting said header above the ground; and releasable clamping means affixed to said second end of said support post for the attachment of said wheel assembly to said cutterbar.

2. The wheel assembly of claim 1 wherein said clamping means includes a locking mechanism to hold said wheel assembly in a clamped position on said cutterbar.

3. The wheel assembly of claim 2 wherein said clamping means clampingly engages one or more of said mower guards.

4. The wheel assembly of claim 3 wherein said clamping means further includes a main body member having a first portion engageable with the underside of said one or more mower guards and a second portion engageable with the upperside of one or more of said mower guards.

5. The wheel assembly of claim 4 wherein said first portion of said main body member is integrally formed with said second portion, said second portion being bent at an acute angle to the plane of said first portion.

6. The wheel assembly of claim 5 wherein said first and second portions of said main body member are generally planar in transverse cross-sectional configuration.

7. The wheel assembly of claim 4 wherein said clamping means further includes a clamping member movably connected to said main body member and cooperable with said locking mechanism to engage said cutterbar and secure said main body member into a preselected position relative to said one or more mower guards.

8. The wheel assembly of claim 7 wherein said clamping member is pivotally connected to said main body member.

9. The wheel assembly of claim 7 wherein said locking mechanism includes a latching member pivotally connected to said post, a generally vertically alignable U-shaped member pivotally connected to said latching member and an elongated clamping bar interconnecting the legs of said U-shaped member and engageable with said clamping member to force said clamping member into engagement with said cutterbar.

10. The wheel assembly of claim 9 wherein said latching member is mounted on a tab projecting from the second end of said support post, the pivotal mounting of said latching member to said tab being eccentric of said post so that said U-shaped member can be positioned in an overcenter relationship to secure said clamping means to said cutterbar.

11. The wheel assembly of claim 9 or 10 wherein said main body member includes two spaced apart slots therein, said U-shaped member being aligned such that the generally vertically extending legs of said U-shaped member are receivable within the slots in said main body member.

12. The wheel assembly of claim 9 or 10 wherein the legs of said U-shaped member are threaded, said elongated clamping bar being mounted on said legs between nuts threaded onto each said leg, said clamping bar being adjustably connected to said U-shaped member through manipulation of said nuts to selectively vary the position of said elongated clamping bar along said legs.

13. The wheel assembly of claim 7 wherein said mower guards are connected to said primary support bar by fastening members projecting below the underside of said mower guards, said first portion of said main body member having a predetermined number of holes therein for receiving a corresponding number of fastening members projecting below said one or more mower guards.

14. The wheel assembly of claim 13 wherein said fastening members comprise bolts having nuts threaded thereon, each said nut being positioned below the underside of the respective said mower guard.

15. The wheel assembly of claim 13 wherein said first portion of said main body member engages the underside of four mower guards, said second portion of said main body member engaging at least two of said four mower guards.

16. The wheel assembly of claim 13 wherein said spindle is positioned to rotatably mount said wheel such that said header is mobilely transportable in a direction, transverse to its normal direction of movement during the harvesting operation.

17. The wheel assembly of claim 16 wherein said spindle is fixedly mounted on said support post and projects out opposing sides of said post to rotatably mount said wheel on one side and detachably connect to an axle of the opposing side.

18. A clamping mechanism for detachably connecting a wheel assembly to the cutterbar of a crop harvesting header to assist in mobilely supporting the header off the ground for the nonoperational transportation thereof, said cutterbar having a primary support bar defining the transverse length of said cutterbar and a plurality of mower guards connected to said primary support bar by fastening members extending below said mower guards, said mower guards projecting longitudinally of said support bar at substantially right angles thereto, said wheel assembly having a wheel rotatably mounted at one end of a support post by a spindle, comprising:

a main body member having a first portion engageable with the underside of one or more of said mower guards and a second portion engageable with the upperside of one or more of said mower guards;

a clamping member pivotally connected to said main body member and engageable with said cutterbar in a preselected position above said main body member, said clamping member being cooperable with said main body member to clampingly engage said cutterbar and releasably affix said wheel assembly thereto; and a locking mechanism cooperatively engageable with said clamping member to lock said clamping member in the preselected position and releasably secure said main body member against one or more of said mower guards.

19. The clamping mechanism of claim 18 wherein said locking mechanism including a latching member pivotally connected to said post, a generally vertically alignable U-shaped member pivotally connected to said latching member and an elongated clamping bar interconnecting the legs of said U-shaped member and engageable with said clamping member.

20. The clamping mechanism of claim 19 wherein said latching member is mounted on a tab projecting from the second end of said support post, the pivotal mounting of said latching member to said tab being eccentric of said post so that said U-shaped member can be positioned in an overcenter relationship to secure said clamping means to said cutterbar.

21. The clamping mechanism of claim 20 wherein the legs of said U-shaped member are threaded, said elongated clamping bar being mounted on said legs between nuts threaded onto each said leg, said clamping bar being adjustably connected to said U-shaped member through manipulation of said nuts to selectively vary the position of said elongated clamping bar along said legs.

22. The clamping mechanism of claim 21 wherein said mower guards are connected to said primary support bar by fastening members projecting below the underside of said mower guards, said first portion of said main body member having a predetermined number of holes therein for receiving a corresponding number of fastening members projecting below said one or more mower guards.

23. The clamping mechanism of claim 22 wherein said main body member includes two spaced apart slots therein, said U-shaped member being aligned such that the generally vertically extending legs of said U-shaped member are receivable within the slots in said main body member.

24. The clamping mechanism of claim 23 wherein said first portion of said main body member engages the underside of four mower guards, said second portion of said main body member engaging at least two of said four mower guards.

25. The clamping mechanism of claim 24 wherein said first portion of said main body member is integrally formed with said second portion, said second portion being bent at an acute angle to the plane of said first portion.

26. The clamping mechanism of claim 25 wherein said first and second portions of said main body member are generally planar in transverse cross-sectional configuration.

* * * * *